US008838583B1

(12) United States Patent
Fox (10) Patent No.: US 8,838,583 B1
(45) Date of Patent: Sep. 16, 2014

(54) DIVERSITY WITHIN SEARCH RESULTS

(75) Inventor: Eric B. Fox, Seattle, WA (US)

(73) Assignee: Amazon Technologies, Inc, Reno, NV (US)

( * ) Notice: Subject to any disclaimer, the term of this patent is extended or adjusted under 35 U.S.C. 154(b) by 190 days.

(21) Appl. No.: 13/253,314

(22) Filed: Oct. 5, 2011

(51) Int. Cl.
*G06F 17/30* (2006.01)

(52) U.S. Cl.
USPC .......................................................... 707/723

(58) Field of Classification Search
None
See application file for complete search history.

(56) References Cited

U.S. PATENT DOCUMENTS

| | | | |
|---|---|---|---|
| 6,775,666 B1 * | 8/2004 | Stumpf et al. | 1/1 |
| 2005/0246328 A1 * | 11/2005 | Zhang et al. | 707/3 |
| 2007/0214131 A1 * | 9/2007 | Cucerzan et al. | 707/5 |
| 2009/0083314 A1 * | 3/2009 | Maim | 707/103 R |
| 2010/0235317 A1 * | 9/2010 | Yu et al. | 706/54 |
| 2012/0254076 A1 * | 10/2012 | Yang et al. | 706/12 |

* cited by examiner

*Primary Examiner* — Wilson Lee
(74) *Attorney, Agent, or Firm* — Thomas|Horstemeyer, LLP.

(57) ABSTRACT

Disclosed are various embodiments for increasing diversity of search results. A computing device performs a search of items in an electronic catalog to produce a plurality of search results. The electronic catalog is stored in a data store accessible to the computing device. A latent group is identified which includes a most relevant one of a plurality of search results. Each of the search results has a plurality of attributes. Membership in the latent group is determined by similarity of a non-indexed one of the attributes. A relevance score of those search results in the identified latent group other than the most relevant one of the search results is reduced.

22 Claims, 5 Drawing Sheets

| | | | |
|---|---|---|---|
| 133A → | 203A → Armitron LX100 | 206A → 92 | $9.95 |
| 133C → | 203C → Timex C18 | 206C → 82 | $19.95 |
| 133D → | 203D → Timex Explorer | 206D → 81 | $14.95 |
| 133E → | 203E → Citizen World | 206E → 76 | $24.95 |
| 133F → | 230F → Casio Shock | 230F → 73 | $29.95 |
| 133B → | 203B → Armitron FX200 | 206B → 72 | $45.00 |
| 133G → | 203G → Casio G-Lite | 206G → 68 | $75.00 |
| 133H → | 203H → Casio Shock-Rock | 206H → 62 | $21.00 |
| 133I → | 203I → Casio G-Shock | 206I → 56 | $62.00 |
| 133J → | 203J → Timex Aviator | 206J → 51 | $49.95 |

DIVERSITY WITHIN SEARCH RESULTS

BACKGROUND

Online shoppers interact with product search engines to find products of interest and obtain information about those products. The product search engine returns summary information for products that most closely match a user's search query. The search results returned by a search engine vary in how relevant each one is to the shopper's query. The search engine may therefore rank the search results in order of relevance, and may present the most relevant pages on a first page of search results while requiring the user to provide additional user input in order to review less relevant search results.

BRIEF DESCRIPTION OF THE DRAWINGS

Many aspects of the present disclosure can be better understood with reference to the following drawings. The components in the drawings are not necessarily to scale, emphasis instead being placed upon clearly illustrating the principles of the disclosure. Moreover, in the drawings, like reference numerals designate corresponding parts throughout the several views.

DETAILED DESCRIPTION

The present disclosure relates to increasing diversity among search results produced by a search query. Each search result is associated with a search relevance score, and results are often ranked by relevance. Embodiments disclosed herein operate to increase the diversity of search results so that the top portion of the relevance ranking is not dominated by many similar items, but instead also includes items that are more diverse. Without this diversity processing, a large number of items that are similar in an attribute such as brand or price may dominate the top ten, top twenty, or even top fifty relevant results. This domination of the top of the relevance range by similar items means that other more diverse items (e.g., different brand, price, etc.) are relegated to being placed farther down in the relevance ranking. Therefore, without diversity processing these diverse items may not be viewed or noticed by users. In the following discussion, a general description of the system and its components is provided, followed by a discussion of the operation of the same.

Figure 1:
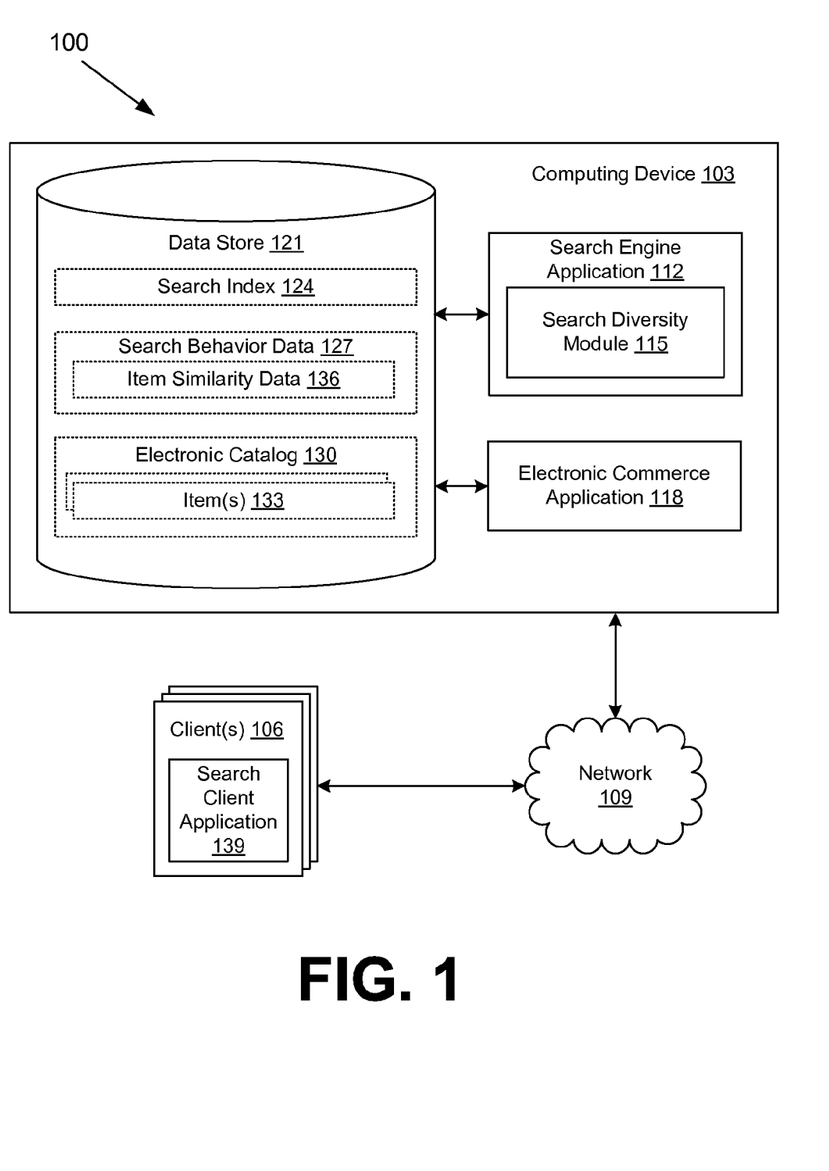
FIG. 1 is a drawing of a networked environment according to various embodiments of the present disclosure.

With reference to FIG. 1, shown is a networked environment 100 according to various embodiments. The networked environment 100 includes a computing device 103 that is in data communication with one or more clients 106 by way of a network 109. The network 109 may include, for example, the Internet, intranets, extranets, wide area networks (WANs), local area networks (LANs), wired networks, wireless networks, or other suitable networks, etc., or any combination of two or more such networks.

The computing device 103 may comprise, for example, a server computer or any other system providing computing capability. Alternatively, a plurality of computing devices 103 may be employed that are arranged, for example, in one or more server banks or computer banks or other arrangements. To this end, a plurality of computing devices 103 together may comprise, for example, a cloud computing resource, a grid computing resource, and/or any other distributed computing arrangement. Such computing devices 103 may be located in a single installation or may be dispersed among many different geographical locations. For purposes of convenience, the computing device 103 is referred to herein in the singular. Even though the computing device 103 is referred to in the singular, it is understood that a plurality of computing devices 103 may be employed in the various arrangements as described above.

Various applications and/or other functionality may be executed in the computing device 103 according to various embodiments. The components executed on the computing device 103, for example, include a search engine application 112, a search diversity module 115, an electronic commerce application 118 and other applications, services, processes, systems, engines, or functionality not discussed in detail herein. Also, various data is stored in a data store 121 that is accessible to the computing device 103. The data stored in the data store 121 may include, for example, at least one search index 124, search behavior data 127, an electronic catalog 130 of items 133, and/or potentially other data. The data store 121 may be representative of a plurality of data stores 121 as can be appreciated. The data stored in the data store 121, for example, is associated with the operation of the various applications and/or functional entities described below.

The search engine application 112 is executed in the computing device 103 to search for items which match a search query. Execution of a search query produces a set of items 133 matching the query, referred to as search results. The search engine application 112 may compute or otherwise obtain a search relevance score for each search result in order to determine which of the complete set of search results are the most relevant to the user's search query. The search engine application 112 may also be executed to encode for rendering by the client 106 at least one network page that includes a list containing some or all of the items 133 generated in response to the search query. Each of the items 133 in the list may include a link to a corresponding network page for the item 133. The search engine application 112 may be a general-purpose search engine that operates to search the Internet as a whole, or may be a site-specific search engine that is limited to searching one or more network sites.

The search engine application 112 uses the search index 124 in the data store 121 to find items 133, documents, files, images, audio, and/or video which match a search query. The search index 124 is an indexed data structure and as such, allows the search engine application 112 to perform searches in a computationally efficient manner.

In performing a search, the search engine application 112 may reference items 133 within the electronic catalog 130. As used herein, the term "item" may refer to a product, good, service, software download, multimedia download, social networking profile, or other item that may be offered for sale, purchase, rental, lease, download, and/or any other form of consumption, as may be appreciated. Data related to items 133, such as titles, descriptions, keywords, metadata, weights, customer reviews, multimedia, etc., are stored by the electronic catalog 130 as attributes. Some of the item attributes are indexed attributes, and are thus directly searchable through the search index 124, while other item attributes are not indexed attributes.

In some embodiments, the items 133 in the electronic catalog 130 are products offered for sale, and in such embodiments, the electronic commerce application 118 is executed in order to facilitate the online viewing and/or purchase of the products from an electronic commerce operator. For example, the electronic commerce application 118 may provide content in response to user queries about items 133 in the electronic catalog 130. To this end, the electronic commerce application 118 may include, or may utilize the services of, a network page server application which is executed to fetch network pages in response to requests from the client device 106. In some embodiments, the network page server application is a web server which is executed to fetch web pages. The network pages fetched by the network page server application may be dynamically generated or may be static. These network pages include various products from the electronic catalog 130. The electronic commerce application 118 may also perform various backend functions associated with the online presence of a merchant in order to facilitate the online purchase of items 133, as should be appreciated.

As searches are performed, the search engine application 112 may generate search behavior data 127. The search behavior data 127 in the data store 121 may include various information that describes past behavior, across multiple users, with respect to searching and/or browsing for items 133, documents, etc. Such information may be aggregated and indexed for each item 133, document, etc. in a search result. The search behavior data 127 may be generated from search queries. Thus, the search behavior data 127 may comprise data describing the association between particular search queries and particular search results. The search behavior data 127 may also be generated from network page view data, item sales data, and/or other data.

The search behavior data 127 stored in the in the data store 121 includes a particular type of search behavior data, referred to herein as item similarity data 136. The item similarity data 136 captures associations between items 133, where these associations are created by user behavior. For example, item B may be deemed to be similar to item A when users who buy item A from the electronic catalog 130 also buy item B from the electronic catalog 130. As another example, item B may be deemed similar to item A when users who view item A in the electronic catalog 130 also view item B in the electronic catalog 130. As yet another example, item B may be deemed to be similar to item A when users who view item A in the electronic catalog 130 also buy item B from the electronic catalog 130. By behaving in this manner, users are indicating which items 133 are considered to be similarly substitutable. The item similarity data 136 may also use relationships between items 133 in the electronic catalog 130 to determine similarity, such as whether items 133 are members of a set or collection (e.g., a series of books or videos), or whether one item is marked as a variation of another item 133 (e.g., a media title on DVD and the same title on Blu-Ray®).

The search diversity module 115 works in conjunction with the search engine application 112 to increase diversity within a set of search results. As described herein, the search diversity module 115 reduces the search relevance score of selected search results based on the similarity of those search results to a result that was already determined to be relevant. For example, if an item 133 of brand X is determined to be most relevant, then the search diversity module 115 may reduce the search relevance score of other search results which also have brand X. In the example embodiment of FIG. 1, the search diversity module 115 is integrated with the search engine application 112, but in other embodiments the search diversity module 115 may be separate from but in communication with the search engine application 112.

The client 106 is representative of a plurality of client devices that may be coupled to the network 109. The client 106 may comprise, for example, a processor-based system such as a computer system. Such a computer system may be embodied in the form of a desktop computer, a laptop computer, a personal digital assistant, a cellular telephone, a set-top box, a music player, a video player, a media player, a web pad, a tablet computer system, a game console, or other devices with like capability. The client 106 may be configured to execute various applications such as a search client application 139 and/or other applications. The search client application 139 may be implemented as a standalone application or may execute in the context of a browser to access and render network pages, such as web pages, or other network content. The client 106 may be configured to execute applications beyond the search client application 139 such as, for example, email applications, instant message applications, and/or other applications.

Next, a general description of the operation of the various components of the networked environment 100 is provided. To begin, a user at a client 106 may execute the search client application 139 to submit a search query to the search engine application 112. The search client application 139 may in turn access a network page from the search engine application 112 on the computing device 103. It is understood that the network page may be provided instead by some other network page server application executing on the computing device 103. The network page may include a form for inputting a search query from the user to the search engine application 112. To this end, the search client application 139 may render, for example, a type of form input field (text, text area, etc.), a search button, and/or other form components. The user may input the search query into the input field in the network page rendered by the search client application 139 and then submit the search query to the search engine application 112.

In response to the search query, the search engine application 112 generates a set of search results and identifies results that are deemed to be the most relevant according to a search relevance score. The search engine application 112 may use item data (e.g., title, description, etc.) and search behavior data 127 in making a relevance determination, as well as other types of information.

The search diversity module 115 operates to increase the diversity of search results so that the top of the relevance ranking is less likely to be dominated by many similar items. The search diversity module 115 increases diversity among search results by identifying results that are similar to a relevant search result, and then decreasing the search relevance score of those similar results. As this process of identifying and decreasing is repeated, similar items 133 are moved down in the relevance ranking, allowing more diverse items 133 to move toward the top. Items may be considered similar when they share the same value for an attribute (e.g., brand), or when they are in the same range of values for an attribute (e.g., price). Items may also be considered similar when the item similarity data 136 derived from user behavior indicates a similarity.

After relevant search results are obtained and diversity processing has been performed, the search engine application 112 then provides the most relevant search results to the client 106. The entire set of results may be provided in a single response, or the results may be instead provided in portions.

The most relevant search results may also be ranked or ordered according to the search relevance score. In some embodiments, the search engine application 112 may generate one or more network pages including the relevant search results, and send these network pages over the network 109. A search client application 139 or other application executing on the client 106 then renders the network page(s) for display to a user.

As users request the search engine application 112 to perform searches using different search queries, and the search engine application 112 provides search results in response to these search queries. As these searches are performed, the search engine application 112 may be executed periodically, or in response to some other trigger, in order to generate search behavior data 127 and/or other data. As users enter search queries and browse through search results, the search engine application 112 may capture within the search behavior data 127 the search queries and associated navigation actions that led users to particular items. The occurrence of more instances of a user reaching a particular item through a particular query leads to a stronger association between the query and the item. In this manner, the search engine application 112 may use the search behavior data 127 to infer the relevance of particular items in connection with particular search queries. As a non-limiting example, an item search using a particular search query and/or search context may return a list of items. When users select an item from the list of items, that item may be deemed more relevant to, or having a stronger association with, that particular search query and/ or search context than the other items. When users take a further action such as, for example, ordering the item, viewing a network page associated with the item, ordering a related item, etc., the item may be considered even more relevant.

Embodiments described herein increase diversity with respect to a particular attribute such as price, brand, etc. This functionality can thus be understood as increasing diversity along a "dimension" or attribute. Various embodiments described herein may increase diversity along any dimension other than a dimension corresponding to a set of search indices 124. Thus, if the search engine application 112 utilizes separate search indices 124 for product category (e.g., a books index, an electronics index, a digital media index, etc.), embodiments of the search diversity module 115 may be configured to increase diversity along a price dimension, a brand dimension, or any other dimension other than the indexed dimension of product category. Furthermore, embodiments of the search diversity module 115 may be configured to increase diversity along an indexed dimension when the discount is applied to specific groups within the dimension. For example, if the search engine application 112 utilizes a price index 124 so that individual prices are indexed, but price ranges are not, embodiments of the search diversity module 115 may be configured to increase diversity among a price similarity dimension in which implicit price groups are identified and the discount applied to search results in an identified group.

As described herein, the search diversity module 115 increases diversity by selecting the most relevant item 133, as determined by its corresponding search relevance score, and then reducing the search relevance score of similar items 133. This process may be repeated in an iterative fashion.

Figure 2A:
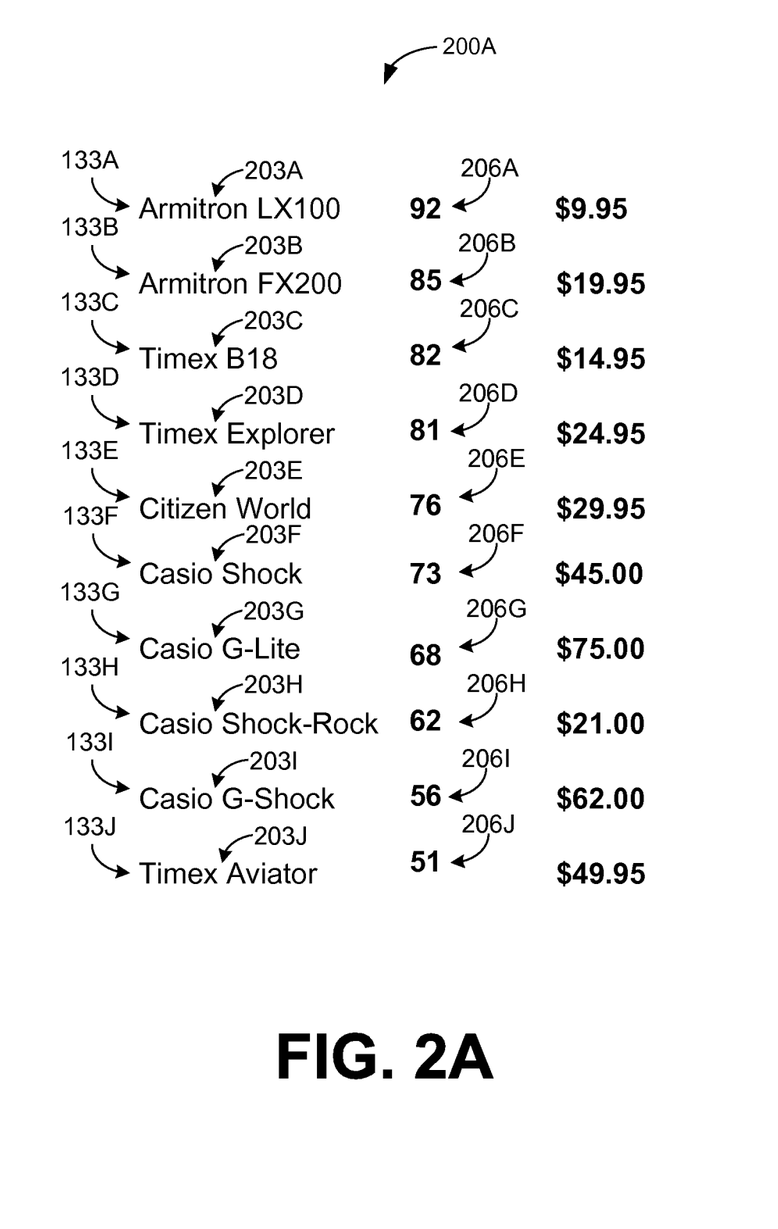
FIGS. 2A-2B are diagrams illustrating the operation of a search engine application in conjunction with a search diversity module in the networked environment of FIG. 1 according to various embodiments of the present disclosure.
Figure 2B:
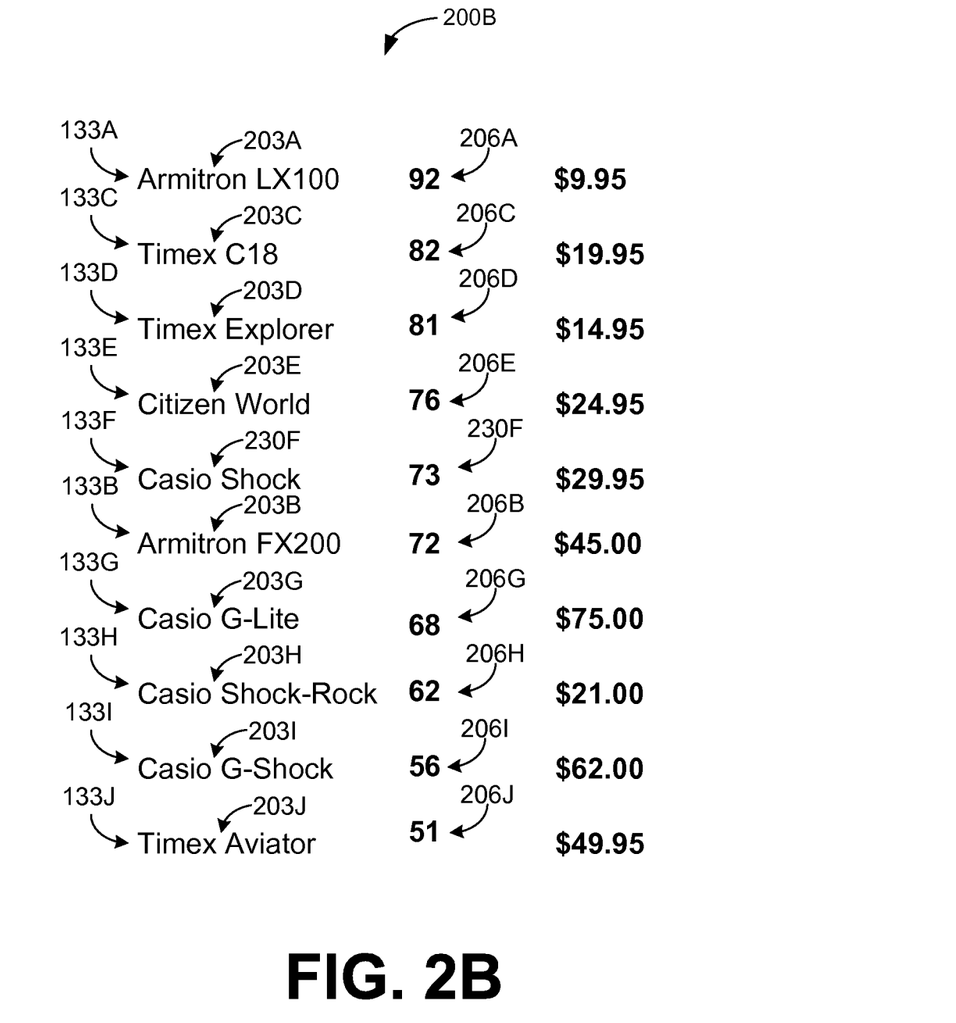

Turning now to FIGS. 2A-B, shown is an example scenario in which the search diversity module 115 operates to increase diversity in a set of search results along a specific dimension or attribute. FIGS. 2A-2B illustrate how the relevance ranking of various items 133 is changed by this process, and how changing the relevance ranking can increase diversity.

FIG. 2A shows an initial set of search results 200A before diversity processing by the search diversity module 115. The set of search results 200A includes ten items 133A-133J. In this embodiment, the item attribute used as the diversity dimension is brand similarity 203A-J. Similarity among brands allows for differences in the brand name (e.g., Sony vs. Sony Corp.) and also captures relationships between brands (e.g., subsidiaries of the same corporation), In this embodiment, the diversity dimension defines implicit or latent groups. These groups are considered latent or implicit because are defined by a non-indexed, and thus not directly searchable, attribute. In the scenario of FIG. 2A, since the diversity dimension is price, those items 133 which are similarly priced form an implicit or latent price group. In this embodiment, items 133A-133J form four brand groups: Armitron, Timex, Citizen, and Casio.

Each of the items 133A-133J also has a search relevance score 206A-J. As noted above, the search relevance score 206 describes how relevant a particular search result is to the user's search query. For ease of explanation, FIGS. 2A and 2B show the items 133A-133J in decreasing order of the search relevance score 206. However, in other embodiments ranking or ordering by relevance may be deferred until after diversity processing, or the results may be ranked by another criteria, or not at all, as may be appreciated.

Moving on to FIG. 2B, shown is the set of search results 200B after one iteration of search diversity processing. Specifically, the search diversity module 115 has modified the unprocessed set of search results 200A by first selecting the most relevant item 133. In this example scenario, the most relevant item is item 133A, which has the highest search relevance score 206 of 92. The search diversity module 115 uses the diversity dimension to determine to which latent group the most relevant item 133 belongs. As noted above, the diversity dimension in this embodiment is brand similarity, and the latent brand group which includes the most relevant item 133A is the brand group Armitron. Having determined the latent group, the search diversity module 115 then reduces the search relevance score 206 of other items 133 in that latent group. Thus, in this example scenario the search diversity module 115 reduces the search relevance score 206 of the other items 133 in the brand group Armitron by reducing item 133C from 83 to 72.

As can be seen in FIG. 2B, the change to the search relevance score 206 of items 133 in the brand group Armitron has caused items 133C-133F to each move up in the relevance ranking. As a result of this change in ranking, diversity along the price dimension was improved. Specifically, whereas only three of the four brand similarity groups appeared in the five most relevant items 133 of the initial search results 200A (FIG. 2A), all four brand similarity groups appear in the five most relevant items 133 after one round of search diversity processing (FIG. 2B).

The embodiments described herein discount the search relevance score 206 of similar items 133 rather than excluding the similar items 133 from the search results entirely. Therefore, the diversity processing described herein produces search results that are likely to have value to both users who value diversity in search results and those who do not.

The brand attribute was used as the diversity dimension in this example, but other attributes may be used as should be appreciated. As but one other example, the diversity dimension may be price similarity. In such embodiments, price similarity may be expressed as a price range. Using the example scenario of FIGS. 2A and 2B but using price diversity instead of brand diversity, the items 133A-133J would then form four price groups: $0.00-$14.99; $15-29.99; $30.00-49.99; and $50.00-$74.99.

More than one diversity dimensions may be applied to the same set of search results, as should be appreciated. As one example, the diversity processing may use the three diversity dimensions of price, brand, and product-type. In embodiments that handle multiple diversity dimensions, the diversity dimensions may be processed serially or in parallel. Alternatively, these embodiments may include a pre-processing function that amalgamates various diversity dimensions into a single model of similar products, and then applies that similarity-dimension to search results.

Figure 3:
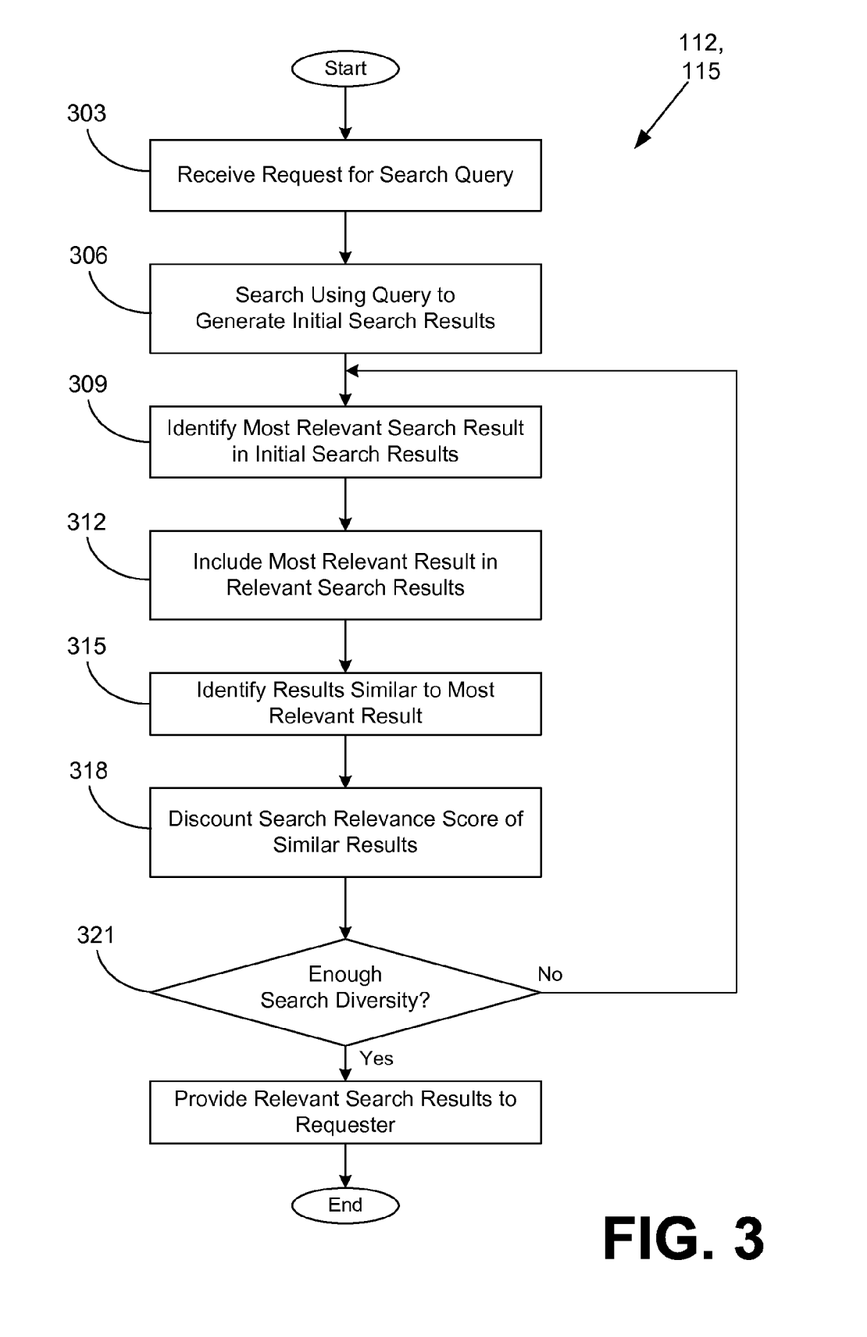
FIG. 3 is a flowchart illustrating one example of functionality implemented as portions of a search engine application in conjunction with a search diversity module executed in a computing device in the networked environment of FIG. 1 according to various embodiments of the present disclosure.

Referring next to FIG. 3, shown is a flowchart that provides one example of the operation of a portion of the search engine application 112 (FIG. 1) in conjunction with the search diversity module 115 (FIG. 1) according to various embodiments. It is understood that the flowchart of FIG. 3 provides merely an example of the many different types of functional arrangements that may be employed to implement the operation of the portion of the search engine application 112 as described herein. As an alternative, the flowchart of FIG. 2 may be viewed as depicting an example of steps of a method implemented in the computing device 103 (FIG. 1) according to one or more embodiments.

Beginning with box 303, the search engine application 112 receives a search request, including a search query, from a client 106 (FIG. 1) over the network 109 (FIG. 1). The search query includes one or more search terms (also referred to as "keywords") and may include connectors (e.g., AND, OR, NOT, NEAR, etc.) or restrictions such as date, language, etc. The search query may be entered in a search client application 139, or entered into a text form within a browser executing on the client 106, or provided by some other method. As a non-limiting example, the search query may be transmitted from the client 106 to the search engine application 112 by way of a hypertext transfer protocol (HTTP) GET, POST, PUT, and/or other request.

Next, at box 306, the search engine application 112 performs a search using the search query obtained in box 303, producing a set of search results. The search diversity module 115 begins processing the initial set of search results as follows. At box 309, the search diversity module 115 identifies the most relevant of the search results based on the search relevance score 206 (FIG. 2) that is associated with each search result. In some embodiments, a high score is considered relevant, where in other embodiments a low score is considered relevant. Next, at box 312, the search diversity module 115 includes the most relevant result, identified at box 309, in a set of relevant search results. In some embodiments, the relevant set of search results is a set separate from the initial set, but in other embodiments, relevant results are instead marked as relevant within the initial set.

At box 315, the search diversity module 115 identifies those search results that are similar to the most relevant result which was identified at box 309. In some embodiments, item similarity data 136 is used to identify similar results. In other embodiments, item attributes are used to determine similarity. For example, items sharing the same value for an attribute (e.g., brand="X") may be considered similar, or items having an attribute value in the same range may be considered similar (e.g., price between $15.00 and $29.99). As another example, items 133 sharing the same browse node in the catalog taxonomy (e.g., consumer electronics, televisions, etc.) may be considered to be similar. Still other mechanisms may be used to identify search results that are similar to one another, as should be appreciated.

Having determined which search results are similar to the most relevant result, at box 318 the search diversity module 115 then reduces or discounts the search relevance score 206 of those similar search results. In various embodiments, the search relevance score 206 may be reduced by a fixed amount, by a fixed percentage, by an amount which increases or decreases with succeeding iterations, or other variations. An appropriate discount may be empirically determined by using a particular discount scheme, then tracking user behavior to determine if the discount scheme results in increased purchases, views, etc. Examples of metrics which may be tracked to evaluate a discount scheme include the units purchased per search query, or gross merchandise sales per search, and units purchased per search session.

As noted above, the relevant item's browse node can be used to determine similarity. In such embodiments, the discount to the search relevance score 206 may be applied only to items 133 sharing the relevant item's browse node, or may also be applied to other items 133 in browse nodes that are higher or lower in the catalog taxonomy. For example, if the relevant item is a plasma screen television, the discount may be applied to all items 133 in the next higher browse node of televisions, which would include other types of televisions.

At box 321, the search diversity module 115 determines whether sufficient search diversity has been obtained. If the search results are sufficiently diverse, processing moves to box 327. If the search results are not yet sufficiently diverse, the search diversity module 115 repeats boxes 309, 312, 315, and 318 to process the next most relevant search result. Thus, the next most relevant search result is identified, and search results similar to the next most relevant result are identified, and the search relevance score 206 of those similar results is discounted.

The functionality of box 321 may use various mechanisms to determine when sufficient search diversity has been reached. In one embodiment, the number of iterations of box 309, 312, 315, and 318 is compared to a predetermined number and diversity processing stops when this predetermined number of iterations has been reached. In some embodiments, sufficient search diversity is determined based on how many latent groups are represented in the N most relevant search results, where N is a predetermined number. As one example, if price similarity is used as the diversity dimension, and four latent price groups are identified, the appearance of all four latent groups in the top ten search results may be considered sufficient diversity. As another example, the appearance of three of the four latent price groups in the top ten search results may be considered sufficient diversity. As yet another example, two of the four latent price groups in the top five search results may be considered sufficient diversity. Other suitable criteria for determining sufficient search diversity can also be used as should be appreciated.

Other embodiments involve applying the identification and discount functionality described above to the N most relevant search results, where N is a predetermined number. In some of these embodiments, N is related to the number of search results that are rendered on a network search page in a search client application 139. For example, N may be the number of search results on a single page, so that the first page of search results benefits from improved diversity. As another example, N may be twice the number of search results rendered on a single page, so that the first two pages of search results benefits from improved diversity.

Other embodiments involve tracking a measure of diversity for the search results. In some of these embodiments, diversity processing stops when the diversity measure reaches a predetermined threshold. In other of these embodiments, diversity processing stops when the diversity measure has improved by a predetermined amount as compared to the diversity of the initial search results obtained at box 306. In still other of these embodiments, the determination of when sufficient diversity has been reached is based on the impact that diversity has to business metrics. Examples of such business metrics include gross merchandise sales, unit sales, and click-through rates on an electronic commerce network site. In still another embodiment (not illustrated), the search diversity module 115 does not determine whether or not sufficient search diversity is obtained, and instead processes each item 133 in the initial search results and discounts the search relevance score 206 appropriately.

At box 327, having determined that the search results are sufficiently diverse, the search engine application 112 provides the relevant search results to the requesting client 106. As a non-limiting example, the relevant search results may be provided in the form of a network page, which may include links to other network pages. In such embodiments, the search engine application 112 may encode the network page for rendering by the client 106 and sends the network page to the client 106 by way of the network 109. In some embodiments, only a portion of the search results are provided on a particular network page, with additional portions of the search results being provided upon user request. Breaking up the search results in this manner may reduce latency when a large number of search results are involved. The process of FIG. 3 is then complete.

Figure 4:
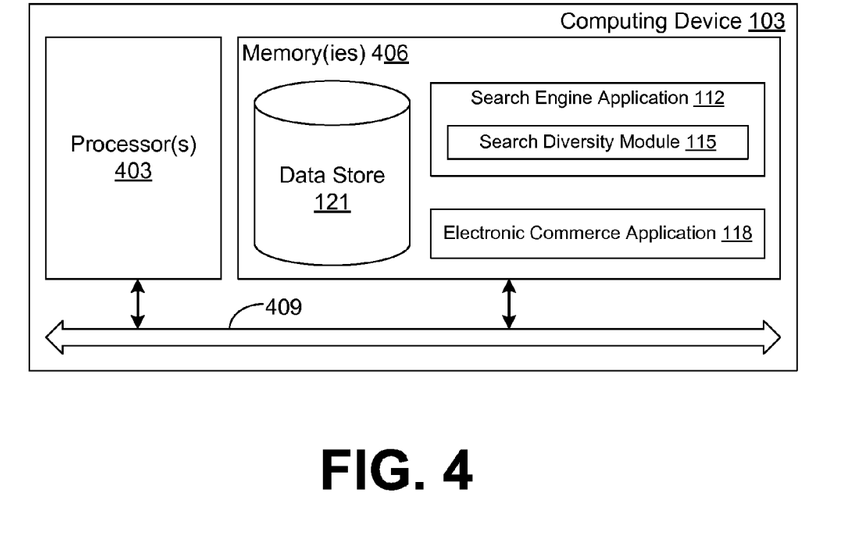
FIG. 4 is a schematic block diagram that provides one example illustration of a computing device employed in the networked environment of FIG. 1 according to various embodiments of the present disclosure.

With reference to FIG. 4, shown is a schematic block diagram of the computing device 103 according to an embodiment of the present disclosure. The computing device 103 includes at least one processor circuit, for example, having a processor 403 and a memory 406, both of which are coupled to a local interface 409. To this end, the computing device 103 may comprise, for example, at least one server computer or like device. The local interface 409 may comprise, for example, a data bus with an accompanying address/control bus or other bus structure as can be appreciated.

Stored in the memory 406 are both data and several components that are executable by the processor 403 in particular, stored in the memory 406 and executable by the processor 403 are the search engine application 112, the search diversity module 115, electronic commerce application 118, and potentially other applications. Also stored in the memory 406 may be a data store 121 and other data. In addition, an operating system may be stored in the memory 406 and executable by the processor 403.

It is understood that there may be other applications that are stored in the memory 406 and are executable by the processor 403 as can be appreciated. Where any component discussed herein is implemented in the form of software, any one of a number of programming languages may be employed such as, for example, C, C++, C#, Objective C, Java, JavaScript, Perl, PHP, Visual Basic, Python, Ruby, Delphi, Flash, or other programming languages.

A number of software components are stored in the memory 406 and are executable by the processor 403. In this respect, the term "executable" means a program file that is in a form that can ultimately be run by the processor 403. Examples of executable programs may be, for example, a compiled program that can be translated into machine code in a format that can be loaded into a random access portion of the memory 406 and run by the processor 403, source code that may be expressed in proper format such as object code that is capable of being loaded into a random access portion of the memory 406 and executed by the processor 403, or source code that may be interpreted by another executable program to generate instructions in a random access portion of the memory 406 to be executed by the processor 403, etc. An executable program may be stored in any portion or component of the memory 406 including, for example, random access memory (RAM), read-only memory (ROM), hard drive, solid-state drive, USB flash drive, memory card, optical disc such as compact disc (CD) or digital versatile disc (DVD), floppy disk, magnetic tape, or other memory components.

The memory 406 is defined herein as including both volatile and nonvolatile memory and data storage components. Volatile components are those that do not retain data values upon loss of power. Nonvolatile components are those that retain data upon a loss of power. Thus, the memory 406 may comprise, for example, random access memory (RAM), read-only memory (ROM), hard disk drives, solid-state drives, USB flash drives, memory cards accessed via a memory card reader, floppy disks accessed via an associated floppy disk drive, optical discs accessed via an optical disc drive, magnetic tapes accessed via an appropriate tape drive, and/or other memory components, or a combination of any two or more of these memory components. In addition, the RAM may comprise, for example, static random access memory (SRAM), dynamic random access memory (DRAM), or magnetic random access memory (MRAM) and other such devices. The ROM may comprise, for example, a programmable read-only memory (PROM), an erasable programmable read-only memory (EPROM), an electrically erasable programmable read-only memory (EEPROM), or other like memory device.

Also, the processor 403 may represent multiple processors 403 and the memory 406 may represent multiple memories 406 that operate in parallel processing circuits, respectively. In such a case, the local interface 409 may be an appropriate network 109 (FIG. 1) that facilitates communication between any two of the multiple processors 403, between any processor 403 and any of the memories 406, or between any two of the memories 406, etc. The local interface 409 may comprise additional systems designed to coordinate this communication, including, for example, performing load balancing. The processor 403 may be of electrical or of some other available construction.

Although the search engine application 112, the search diversity module 115, electronic commerce application 118, and other various systems described herein may be embodied in software or code executed by general purpose hardware as discussed above, as an alternative the same may also be embodied in dedicated hardware or a combination of software/general purpose hardware and dedicated hardware. If embodied in dedicated hardware, each can be implemented as a circuit or state machine that employs any one of or a combination of a number of technologies. These technologies may include, but are not limited to, discrete logic circuits having logic gates for implementing various logic functions upon an application of one or more data signals, application specific integrated circuits having appropriate logic gates, or other components, etc. Such technologies are generally well known by those skilled in the art and, consequently, are not described in detail herein.

The flowchart of FIG. 3 shows the functionality and operation of an implementation of portions of the search engine application 112 and the search diversity module 115. If embodied in software, each block may represent a module, segment, or portion of code that comprises program instructions to implement the specified logical function(s). The program instructions may be embodied in the form of source code that comprises human-readable statements written in a programming language or machine code that comprises numerical instructions recognizable by a suitable execution system such as a processor 403 in a computer system or other system. The machine code may be converted from the source code, etc. If embodied in hardware, each block may represent a circuit or a number of interconnected circuits to implement the specified logical function(s).

Although the flowchart of FIG. 3 shows a specific order of execution, it is understood that the order of execution may differ from that which is depicted. For example, the order of execution of two or more blocks may be scrambled relative to the order shown. Also, two or more blocks shown in succession in flowchart of FIG. 3 may be executed concurrently or with partial concurrence. Further, in some embodiments, one or more of the blocks shown in FIG. 3 may be skipped or omitted. In addition, any number of counters, state variables, warning semaphores, or messages might be added to the logical flow described herein, for purposes of enhanced utility, accounting, performance measurement, or providing troubleshooting aids, etc. It is understood that all such variations are within the scope of the present disclosure.

Also, any logic or application described herein, including the search engine application 112, the search diversity module 115, electronic commerce application 118, that comprises software or code can be embodied in any non-transitory computer-readable medium for use by or in connection with an instruction execution system such as, for example, a processor 403 in a computer system or other system. In this sense, the logic may comprise, for example, statements including instructions and declarations that can be fetched from the computer-readable medium and executed by the instruction execution system. In the context of the present disclosure, a "computer-readable medium" can be any medium that can contain, store, or maintain the logic or application described herein for use by or in connection with the instruction execution system. The computer-readable medium can comprise any one of many physical media such as, for example, electronic, magnetic, optical, electromagnetic, infrared, or semiconductor media. More specific examples of a suitable computer-readable medium would include, but are not limited to, magnetic tapes, magnetic floppy diskettes, magnetic hard drives, memory cards, solid-state drives, USB flash drives, or optical discs. Also, the computer-readable medium may be a random access memory (RAM) including, for example, static random access memory (SRAM) and dynamic random access memory (DRAM), or magnetic random access memory (MRAM). In addition, the computer-readable medium may be a read-only memory (ROM), a programmable read-only memory (PROM), an erasable programmable read-only memory (EPROM), an electrically erasable programmable read-only memory (EEPROM), or other type of memory device.

It should be emphasized that the above-described embodiments of the present disclosure are merely possible examples of implementations set forth for a clear understanding of the principles of the disclosure. Many variations and modifications may be made to the above-described embodiment(s) without departing substantially from the spirit and principles of the disclosure. All such modifications and variations are intended to be included herein within the scope of this disclosure and protected by the following claims.

Therefore, the following is claimed:

1. A non-transitory computer-readable medium embodying a program executable in a computing device, the program, when executed by the computing device, directing the computing device to at least:

receive a request for a product search corresponding to a search query;

perform the product search in accordance with the search query to produce a plurality of initial product search results;

identify a most relevant product search result of the plurality of initial product search results;

include in a plurality of filtered product search results the most relevant product search result;

identify other product search results in the plurality of initial product search results that are similar to the most relevant product search result based at least in part on item similarity data derived from behavior-based search data;

discount a relevance score of the other product search results;

repeatedly discount the relevance score until a search diversity score associated with the product search is improved by a predefined threshold; and provide the plurality of filtered product search results in response to the request.

2. The non-transitory computer-readable medium of claim 1, wherein the computing device is further directed to at least provide the plurality of filtered search results as a network page that is encoded for rendering by a browser executing on a second computing device.

3. The non-transitory computer-readable medium of claim 1, wherein the computing device is further directed to at least perform the product search separately from being directed to discount the relevance score.

4. A computer-implemented method, comprising:

performing, in a first computing device, a search of items in an electronic catalog to produce a plurality of search results, the electronic catalog stored in a data store accessible to the first computing device;

identifying, in the first computing device, a latent group that includes a most relevant search result of the plurality of search results, at least one of the plurality of search results having a plurality of attributes, membership in the latent group being determined by similarity of a non-indexed attribute of the plurality of attributes;

reducing, in the first computing device, a relevance score of search results in the latent group other than the most relevant search result;

selecting, in the first computing device, a portion of the plurality of search results as relevant search results based at least in part on reduced relevance scores; and providing, by the first computing device, the portion of the plurality of search results to a second computing device for rendering.

5. The computer-implemented method of claim 4, wherein the non-indexed attribute is selected from at least one of a price, a manufacturer, or a brand.

6. The computer-implemented method of claim 4, wherein the non-indexed attribute corresponds to a diversity dimension, and the identifying and the reducing improve a diversity of the plurality of search results along the diversity dimension.

7. The computer-implemented method of claim 4, further comprising repeating the identifying and the reducing at least once.

8. The computer-implemented method of claim 4, further comprising repeating the identifying and the reducing for a predetermined number of iterations.

9. The computer-implemented method of claim 8, wherein the predetermined number of iterations corresponds to a number of the plurality of search results rendered by a browser on a single network page.

10. The computer-implemented method of claim 4, further comprising repeating the identifying and the reducing until a search diversity score is improved by a predetermined amount.

11. The computer-implemented method of claim 10, further comprising computing the search diversity score using at least one of a quantity of gross merchandise sales, a quantity of unit sales, or a click-through rate on an electronic commerce network site.

12. The computer-implemented method of claim 4, wherein the plurality of search results correspond to a search query.

13. The computer-implemented method of claim 4, further comprising providing the plurality of search results to the second computing device for rendering, after the reducing.

14. The computer-implemented method of claim 4, further comprising ranking the plurality of search results according to the reduced relevance scores.

15. The computer-implemented method of claim 4, further comprising:
- identifying, in the first computing device, another latent group that includes the most relevant search result as determined by a similarity of another non-indexed attribute of the plurality of attributes; and
- reducing, in the first computing device, a relevance score of search results in the another latent group other than the most relevant search result.

16. A system comprising:
- a data store configured to store search data; and
- at least one computing device in communication with the data store, the at least one computing device configured to at least:
  - obtain a set of initial search results from the search data, at least one search result in the set of initial search results having a relevance score;
  - include in a set of filtered search results a most relevant search result in the set of initial search results based at least in part on the relevance score;
  - discount a relevance score of other search results in the set of initial search results that are similar to the most relevant search result based at least in part on item similarity data derived from search behavior data; and
  - include in the set of filtered search results a next most relevant search result in the set of initial search results, wherein the next most relevant search result is determined using discounted relevance scores.

17. The system of claim 16, wherein the at least one computing device is further configured to at least repeat the discount of the relevance score at least once.

18. The system of claim 16, wherein the at least one computing device is further configured to at least repeat the discount of the relevance score for a predetermined number of iterations.

19. The system of claim 16, wherein the at least one computing device is further configured to at least discount the relevance score until a search diversity score is improved by a predetermined amount using at least one of a quantity of gross merchandise sales, a quantity of unit sales, or a click-through rate on an electronic commerce network site.

20. The system of claim 16, wherein the at least one computing device is further configured to at least rank the set of initial search results according to the discounted relevance scores.

21. The system of claim 16, wherein the at least one computing device is further configured to at least provide the set of filtered search results to a second device for rendering.

22. The system of claim 16, wherein the at least one computing device is further configured to perform a search of items in an electronic catalog to produce the set of initial search results.

* * * * *